United States Patent [19]

Spoonemore

[11] Patent Number: 5,253,445
[45] Date of Patent: Oct. 19, 1993

[54] DISCOIDAL FISHING FLOAT

[76] Inventor: Bert Spoonemore, Rte. 10, Box 22, Moore, Okla. 73165

[21] Appl. No.: 950,289

[22] Filed: Sep. 24, 1992

[51] Int. Cl.⁵ .............................................. A01K 85/01
[52] U.S. Cl. ......................................... 43/17; 43/44.87
[58] Field of Search .................... 43/4, 44.87, 44.88, 43/44.92, 44.9, 17

[56] References Cited

U.S. PATENT DOCUMENTS

| | | | |
|---|---|---|---|
| 1,175,968 | 3/1916 | Meiners | 43/17 |
| 2,578,878 | 12/1951 | Zaikoski | 43/44.9 |
| 2,779,122 | 1/1957 | De Groff | 43/17 |
| 2,915,847 | 12/1959 | Hancock | 43/44.87 |
| 3,214,858 | 11/1965 | Louie | 43/44.88 |
| 4,934,090 | 6/1990 | Storey et al. | 43/17 |
| 5,048,219 | 9/1991 | Georgescu | 43/17 |

Primary Examiner—Mark Rosenbaum
Assistant Examiner—James Miner
Attorney, Agent, or Firm—Kokjer, Kircher, Bowman & Johnson

[57] ABSTRACT

A discoidal float for "jug" fishing. A buoyant disk has its opposite sides painted to contrast in color. A fishing line is connected to a center post on the disk and carries a weight on its opposite end. Fish hooks are secured to the line. When a fish strikes, the downward pull on the line inverts the disk to visually indicate by the contrasting colors that a strike has occurred. The line can be wound up in a peripheral groove on the disk. Thumb and finger recesses in one side of the disk facilitate gripping it when the line is being wound. A counterweight on the bottom side of the disk provides it with stability when floating normally and allows it to be inverted in response to a strike.

13 Claims, 2 Drawing Sheets

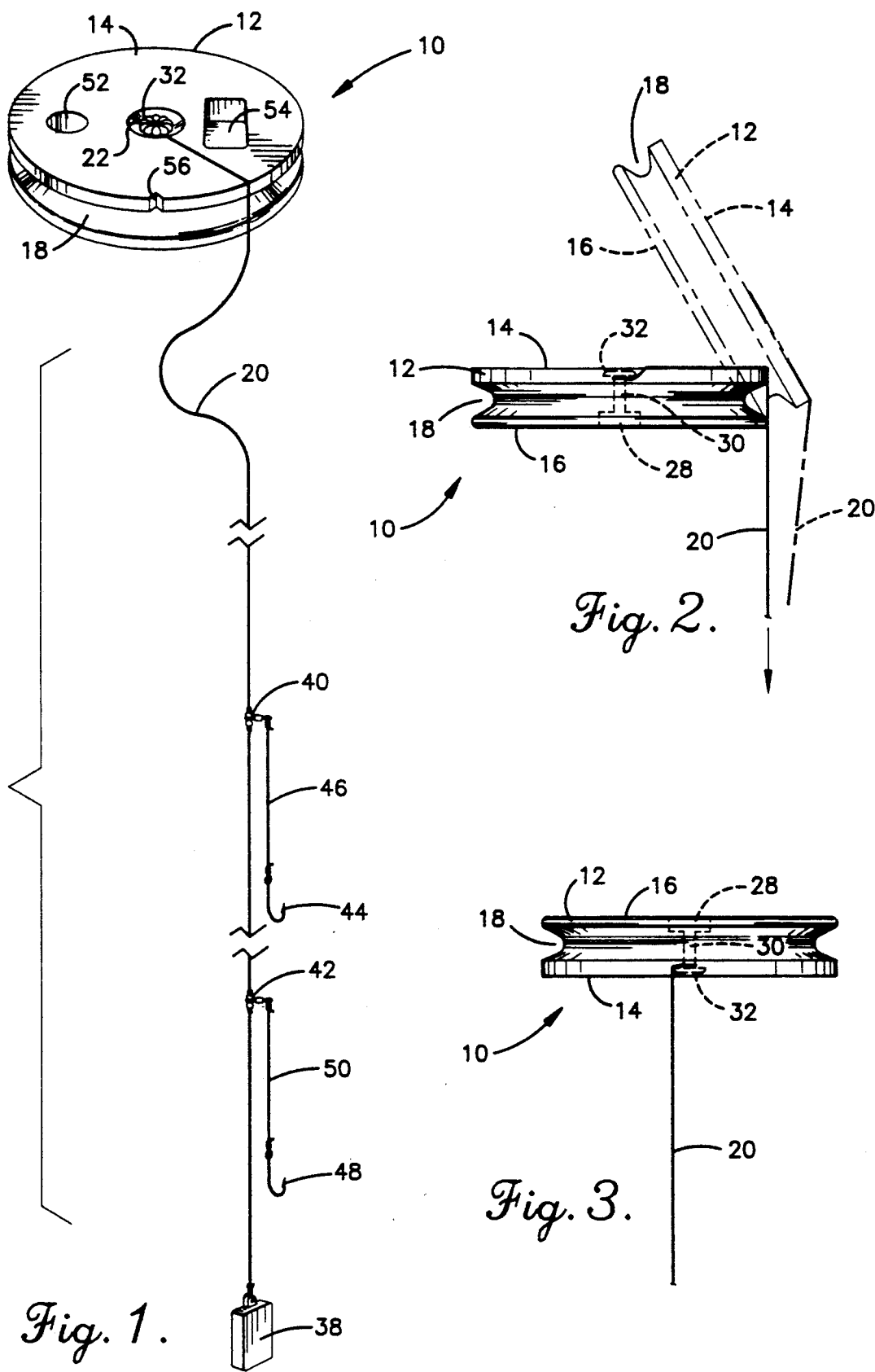

ered to as "jug" fishing has been popular for some time. Jug fishing derives its name from the fact that empty plastic bottles or jugs are used as floats from which fishing lines extend into the water. The line carries a weight on its end and one or more baited fish hooks at various depths in the water. When a fish strikes on the bait, the movement of the jug provides an indication of the strike.

DISCOIDAL FISHING FLOAT

FIELD OF THE INVENTION

This invention relates generally to fishing accessories and more particularly to a float from which a fishing line extends and which is constructed to provide a clear visual indication of a strike on the line.

BACKGROUND OF THE INVENTION

A fishing technique that is commonly referred to as "jug" fishing has been popular for some time. Jug fishing derives its name from the fact that empty plastic bottles or jugs are used as floats from which fishing lines extend into the water. The line carries a weight on its end and one or more baited fish hooks at various depths in the water. When a fish strikes on the bait, the movement of the jug provides an indication of the strike.

A number of difficulties and inconveniences are encountered in traditional jug fishing. Perhaps the most troublesome aspect of jug fishing is that the plastic jugs occupy considerable space and clutter up the boat. They are also not constructed for convenient winding of the fishing line, and tangles and snarls in the line are common. It is necessary to rely on movement of the jug to indicate a strike, and it is not always easy to determine when a fish has been hooked. If the fisherman fails to pay close attention to the floating jug, a strike can occur without his knowledge. Even if the jug is carefully monitored, it may not move enough in response to a strike to be easily noticed. Conversely, movement of the jug due to wind or currents or for some reason other than a strike can be misconstrued as a strike.

SUMMARY OF THE INVENTION

The present invention is directed to a fishing device which represents a considerable improvement over the plastic jugs that are traditionally used in jug fishing. In accordance with the invention, a float for use in jug fishing takes the form of a flat disk constructed of a buoyant material such as foam. The opposite sides of the disk are painted contrasting colors such as yellow and red so that a clear visual indication is given as to the side facing upwardly at any time. The fishing line is tied at one end to a center post recessed in one side of the float (the yellow side, for example). The opposite side of the float may be painted red and has a counterweight at its center. The disk normally floats with the yellow side up, and the counterweight assures that the disk is stable in its normal position. The fishing line carries a weight and one or more fish hooks. When a fish strikes on one of the hooks, the downward pull on the line inverts the float so that the red side then faces upwardly to give the fisherman a clear visual indication of a strike.

The disk is characterized by a peripheral groove which allows the line to be wound up and conveniently stored in the groove when the float is not in use. To facilitate winding and unwinding of the line, the yellow side of the disk is provided with thumb and finger recesses which allow the fisherman to conveniently and securely grip the disk while the line is being wound up or paid out. The finger recess has a size and shape to closely receive the weight so that all of the components are stored in a compact condition. The disk is flat on both sides and can be stacked neatly on other disks in a compact stack which greatly reduces cluttering of the boat.

DESCRIPTION OF THE DRAWINGS

In the accompanying drawings which form a part of the specification and are to be read in conjunction therewith and in which like reference numerals are used to indicate like parts in the various views:

FIG. 1 is a perspective view of a discoidal fishing float constructed according to a preferred embodiment of the present invention, with the fishing line unwound and extending down into the water and with the break lines indicating continuous length;

FIG. 2 is a fragmentary side elevational view showing the disk in its normal position floating on the water, with the broken lines depicting the disk in the process of being inverted due to downward pulling of the line caused by a fish strike;

FIG. 3 is a fragmentary elevational view similar to FIG. 2, but showing the disk completely inverted due to a strike;

DETAILED DESCRIPTION OF THE INVENTION

Figure 4:
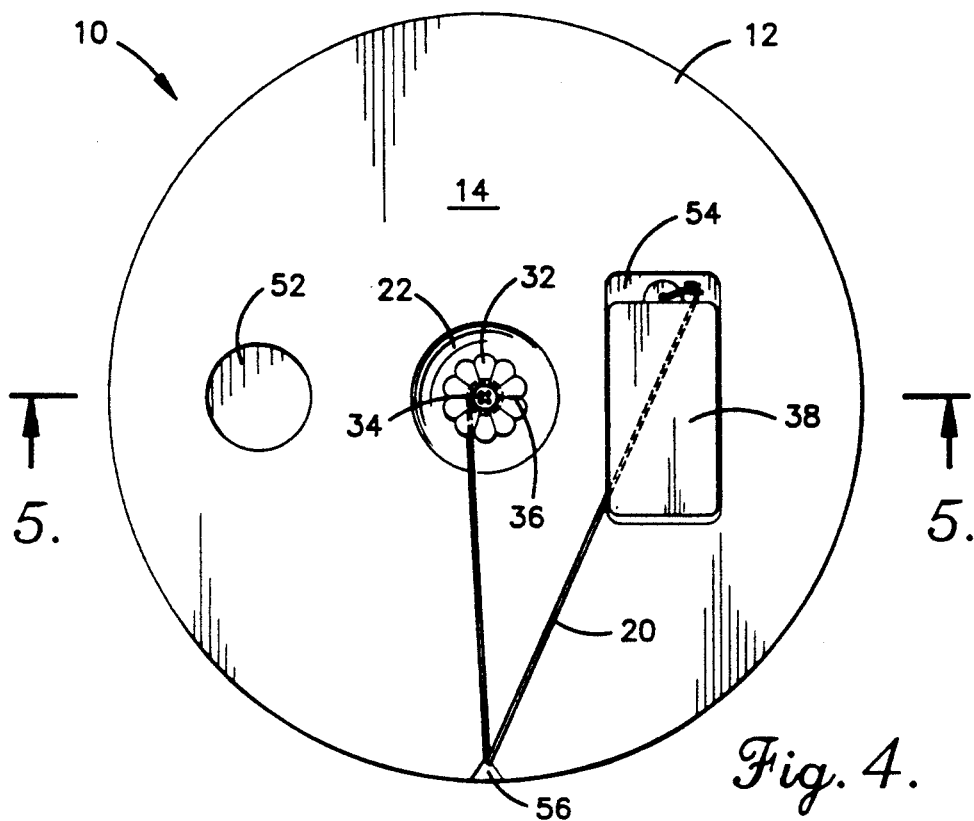
FIG. 4 is an enlarged top plan view of the disk in its storage condition, with the line wound up around the periphery of the disk and the weight stored in the finger recess.

Referring now to the drawings in more detail, numeral 10 generally designates a float which is used in place of the jug commonly used in "jug" fishing. The body of the float 10 takes the form of a disk 12. The opposite sides 14 and 16 of the disk are flat circular surfaces which are parallel to one another. The periphery of the disk 12 is circular and presents a groove 18 in which a fishing line 20 may be wound when the float is not in use. By way of example, the disk 12 may have a diameter of 10 inches and a thickness of 2 inches.

The disk 12 is constructed of a buoyant material such as a relatively soft foam substance. The opposite sides 14 and 16 are painted in contrasting colors. For example, side 14 which is the side of the disk that normally faces upwardly may be painted yellow. The opposite side 16 normally faces downwardly and may be painted red. As can easily be appreciated, the particular colors of the sides 14 and 16 are not important. However, it is important to the invention that the two sides be readily distinct in appearance so that the side which is facing upwardly at any time can be visually determined from a distance.

Figure 5:
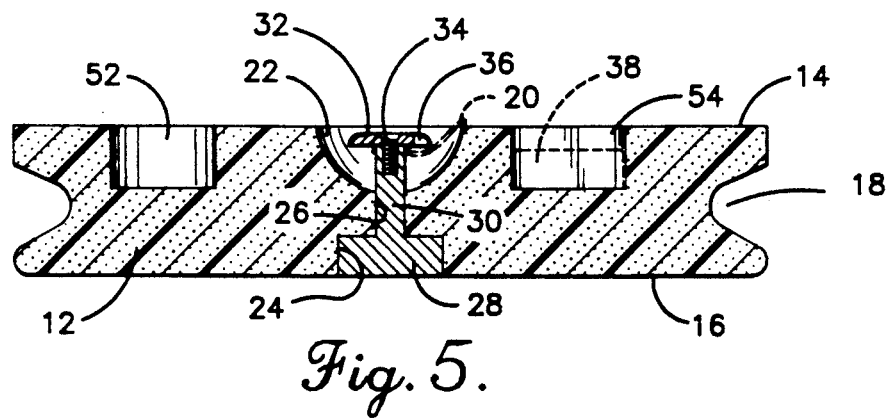
FIG. 5 is a sectional view taken generally along line 5—5 of FIG. 4 in the direction of the arrows.

As best shown in FIG. 5, the yellow, upwardly facing surface 14 is provided at its center with a cup-shaped recess 22. Below the recess 22, a circular recess 24 is formed in the other side 16 of the disk. A passage 26 connects the recesses 22 and 24. A counterweight 26 fits closely in recess 24 and is secured in place by glue or any other suitable means. The counterweight 26 may be constructed of any relatively heavy material, and the counterweight is centered on the lower surface 16 of the disk. Projecting upwardly from the body of the counterweight 28 is a post 30 which extends through the passage 26 and into the cup-shaped recess 22. Secured to the top end of post 30 at a location within recess 22 is a generally circular rosette 32. The rosette 32 is secured on top of the post 30 by a screw 34. As shown in FIG. 4, a small slot 36 is formed between two of the adjacent "petals" of the rosette 32.

The rosette 32 is recessed below surface 14 of the disk. The post 30 and rosette 32 are both centered at the geometric center of the circular side 14 of the disk.

One end of the fishing line 20 is secured to the post 30, as by tying the line to the post. The rosette 32 prevents the line from slipping off of the post. The opposite end of the fishing line 20 is tied or otherwise secured to a weight 38 which may have a generally rectangular shape. At suitably spaced locations between the opposite ends of the fishing line 20, the line is provided with respective swivel connectors 40 and 42. A fish hook 44 is connected with the swivel connector 40 by a leader line 46. Similarly connected to the other swivel connector 42 is another fish hook 48 which is tied to the end of a leader line 50 extending from the swivel 42.

A circular thumb opening 52 is formed in side 14 of the disk at a location approximately midway between the central recess 22 and the periphery of the disk. On the opposite side of the central recess 22, a finger recess 54 is formed in side 14 of the disk. The sizes and locations of the recesses 52 and 54 are such that the disk 12 can be conveniently and securely gripped by placing the thumb in recess 52 and the fingers in the other recess 54. The disk 12 is provided with a V-shaped notch 56 which is located at the periphery of side 14 and opens into the groove 18.

In use of the float 10, the weight 38 is dropped into the water, and the line 20 is paid out until there is sufficient line for the float to rest on the bottom of the lake or other body of water in which the float is being used. Preferably, once the float has reached the bottom, the line is paid out an additional four or five feet in order to provide the line with four or five feet of slack. For example, about 60 feet of fishing line 20 is paid out if the water depth is 55 feet. If there is excess fishing line, the excess line can be passed through the notch 56, looped around the center post 30 and then inserted into the slot 36 in the rosette 32 in a manner to secure the line with the desired length extending from the float.

The hooks 44 and 48 are baited and the float 10 is dropped into the water with its yellow side 14 facing upwardly. The line 20 extends radially along surface 14 and downwardly from its edge into the water. The flat construction of the disk and the presence of the counterweight 28 at the center of the bottom side 16 of the disk assures that the disk 12 will float in a stable position and will not be turned over by wind or waves. Because the flat yellow side 14 faces upwardly and contrasts in color to the lower side 16, the fisherman can easily monitor the float visually and is given an indication of which side 14 or 16 is facing upwardly. So long as the yellow side 14 is visible, a strike has not occurred.

However, when a strike does occur, the fish striking on one of the hooks 44 or 48 pulls the line 20 downwardly. This exerts a force on the center post 30 and the periphery of the disk and causes the disk 12 to tip in the manner indicated in broken lines in FIG. 2. Continued downward pulling on the line causes the disk 12 to completely invert to the position shown in FIG. 3. In this position, the yellow side 14 faces downwardly and the red side 16 faces upwardly where it is readily visible to the fisherman to provide him with a clear visual indication that a strike has occurred.

The special construction of the disk 12 allows the line 20 to be retrieved in a simple and effective manner. The fisherman grasps the disk with the thumb of one hand in the thumb recess 52 and the fingers in the finger recess 54. The line 20 is strung through the notch 56 and into the peripheral groove 18. The line can then be wound up into the groove 18 while the disk 12 is held in the manner of a bowling ball.

Figure 6:
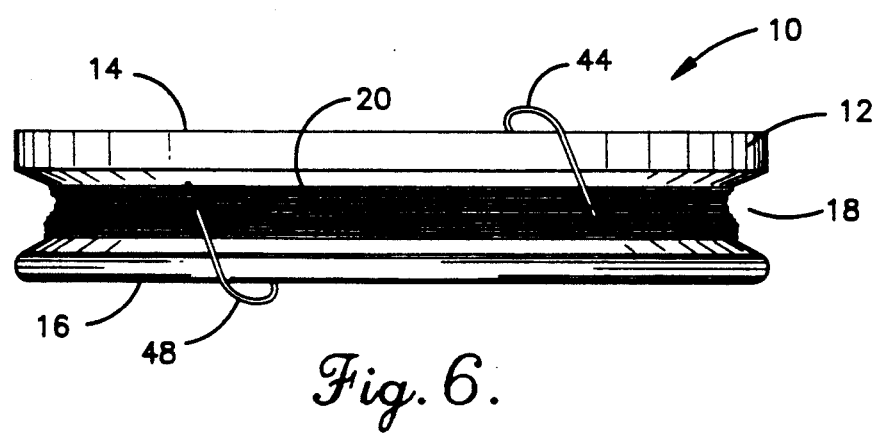
FIG. 6 is a side elevational view of the disk showing the line wound up in the peripheral groove and the two fish hooks stored by hooking them into the opposite sides of the disk.

When the line has been wound up far enough for the top hook 44 to reach a position adjacent to the disk, the top hook 44 is hooked into the top surface 14 of the disk, as best shown in FIG. 6. Subsequently, when the lower hook 48 is located adjacent to the disk, it is hooked into the bottom surface 16 of the disk. By hooking the fish hooks to the disk in this manner, the fisherman is able to easily determine which hook should be removed first when the disk is used again. In addition, the hooks are stored on the disk in a compact and safe manner. When the line is wound sufficiently for the weight 38 to be located adjacent to the disk, the line is again passed through the notch 56, and the weight 38 is inserted into the finger recess 54, as shown in FIG. 4. Preferably, the recess 54 has a size and shape to receive the weight 38 in a relatively close fit.

It is noted that in the storage condition of the disk shown in FIG. 4, all of the components are stored on the disk in a compact manner, with the line 20 wound tightly in the groove 18 and with the weight 38 fitting in the recess 54. The disk thus presents a compact configuration in the stored condition. It is noteworthy that the opposite sides 14 and 16 of the disk are flat so that multiple disks can be stored on top of one another in a neat and compact stack which reduces clutter in the boat.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A fishing device comprising:
   a discoidal float constructed of a buoyant material and having opposite first and second substantially flat surfaces which are visually distinct, said float being constructed to float on the water surface in a stable condition with said first surface facing upwardly in a visible position;
   an elongated fishing line having opposite first and second ends and carrying fish hook means between said ends;
   a generally circular periphery on said float presenting a groove in which said line can be wound in a stored condition;
   a first recess in said first surface of the float for receiving said weight in a storage condition;
   a second recess in said first surface of the float spaced from said first recess, said second recess being located to receive the thumb while fingers are received in said first recess to facilitate gripping and holding the float while said line is being wound in said groove;

a weight on said first end of the fishing line; and means for connecting said second end of the fishing line to said float in a manner to effect inversion of the float in response to downward pulling of the fishing line when a fish strikes on said hook means, thereby making said second surface visible to provide a visual indication of a strike.

2. The device of claim 1, wherein said first and second surfaces of the float differ in color.

3. The device of claim 1, wherein said connecting means comprises a connection element on said float generally centered on said first surface and adapted to receive and retain said second end of the line.

4. The device of claim 1, wherein said connecting means comprises:

a connection element to which said second end of the line is secured; and a third recess in said first surface of the float in which said connection element is mounted, said third recess being substantially centered on said first surface.

5. The device of claim 1, including a counterweight on said float substantially centered thereon adjacent said second surface.

6. A fishing device comprising:

a float having a discoidal shape and presenting opposite first and second surfaces and a substantially round periphery, said float being constructed of a buoyant material;

a post substantially centered on said first surface of the float;

a fishing line carrying a weight at one end and being secured to said post at another end;

a slot on said post in which the fishing line can be secured;

means between the ends of said fishing line for connecting a hook thereto; and a groove in the periphery of said float in which said line can be wound in a storage condition.

7. The device of claim 6, wherein said post is recessed in the first surface of the float.

8. The device of claim 6, including a counterweight connected with said post adjacent said second surface of the float to stabilize the float when floating on the water in a normal position with said first surface facing upwardly at a visible location.

9. The device of claim 8, wherein:

said first and second surfaces of the float are different in color; and said line is secured to the connection element in a manner to effect inversion of the float from said normal position in response to downward pulling on the line when a fish strikes the hook, thereby making the second surface of said float visible to provide a visual indication of a strike.

10. The device of claim 9, including a notch in said float adjacent the periphery thereof for receiving the line when wound in the groove.

11. The device of claim 6, including a notch in said float adjacent the periphery thereof for receiving the line when wound in the groove.

12. The device of claim 6, including finger and thumb recesses in one of said surfaces of the float for receiving the fingers and thumb to facilitate gripping of the float for winding and unwinding of the line.

13. A fishing device comprising:

a float having a discoidal shape and presenting opposite first and second surfaces and a substantially round periphery, said float being constructed of a buoyant material and said first and second surfaces being different in color;

a counterweight on the float adjacent said second surface to stabilize the float when floating on the water in a normal position with said first surface facing upwardly at a visible location;

a fishing line having opposite first and second ends and carrying a weight at said first end;

means between the ends of said fishing lure for connecting a hook thereto;

a groove in the periphery of said float in which said line can be wound in a storage condition;

a notch in said float adjacent the periphery thereof for receiving the line when wound in the groove; and means for securing said second end of the line to said float at a location substantially centered on said first surface and in a manner to effect inversion of the float from said normal position in response to downward pulling on the line when a fish strikes the hook, thereby making the second surface of said float visible to provide a visual indication of a strike.

* * * * *